(12) United States Patent
Li et al.

(10) Patent No.: US 10,674,087 B1
(45) Date of Patent: Jun. 2, 2020

(54) ELECTRONIC STABILIZATION METHOD, IMAGE ACQUISITION DEVICE, AND MOVABLE PLATFORM

(71) Applicant: SZ DJI TECHNOLOGY CO., LTD, Shenzhen (CN)

(72) Inventors: Bing Li, Shenzhen (CN); Wen Zou, Shenzhen (CN); Jun Ma, Shenzhen (CN); Guangyuan Lin, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/538,946

(22) Filed: Aug. 13, 2019

Related U.S. Application Data (63) Continuation of application No. PCT/CN2019/085265, filed on Apr. 30, 2019.

(51) Int. Cl.
*H04N 5/232* (2006.01)
*G06T 7/10* (2017.01)
*H04N 5/72* (2006.01)
*G06T 5/50* (2006.01)

(52) U.S. Cl.
CPC ......... *H04N 5/23254* (2013.01); *G06T 5/50* (2013.01); *G06T 7/10* (2017.01); *H04N 5/23258* (2013.01); *H04N 5/72* (2013.01); *G06T 2207/20221* (2013.01)

(58) Field of Classification Search
None
See application file for complete search history.

(56) References Cited

U.S. PATENT DOCUMENTS

| | | |
|---|---|---|
| 6,222,882 B1 | 4/2001 | Lee et al. |
| 2014/0160309 A1* | 6/2014 | Karpenko ............... H04N 5/77 348/208.6 |
| 2016/0105648 A1* | 4/2016 | Eline ................ H04N 5/23264 348/144 |
| 2018/0173245 A1* | 6/2018 | Twining ............... B64D 45/00 |
| 2019/0297283 A1* | 9/2019 | Douady ............... H04N 19/85 |

FOREIGN PATENT DOCUMENTS

| | | |
|---|---|---|
| CN | 104796596 A | 7/2015 |
| CN | 106060249 A | 10/2016 |
| CN | 108600622 A | 9/2018 |

OTHER PUBLICATIONS

International Search Report dated Jan. 7, 2020, in corresponding International Application No. PCT/CN2019/085265 (4 pages).
International Search Report dated Jan. 7, 2020, in corresponding International Application No. PCT/CN2019/085265 (7 pages).

* cited by examiner

*Primary Examiner* — James M Hannett
(74) *Attorney, Agent, or Firm* — Finnegan, Henderson, Farabow, Garrett & Dunner, LLP (57) ABSTRACT

The present disclosure provides an image stabilization method. The method includes acquiring a frame of an image to be stabilized and a related exposure time; acquiring first attitude data before the exposure time and second attitude data after the exposure time, wherein the number of the first attitude data is one or more, and the number of the second attitude data is one or more; acquiring a target attitude corresponding to the exposure time based on the first attitude data and the second attitude data; and obtaining a stabilized target image by stabilizing the image to be stabilized according to the target attitude.

18 Claims, 4 Drawing Sheets

| 501 Segmenting the image to be stabilized based on a segmentation method to obtain a plurality of sub-images |

| 502 Stitching one or more of the plurality of sub-images based on the target attitude corresponding to the exposure time of the image to be stabilized to obtain a frame of stitched image; and the stitched image may be the stabilized target image |

ELECTRONIC STABILIZATION METHOD, IMAGE ACQUISITION DEVICE, AND MOVABLE PLATFORM

CROSS-REFERENCE TO RELATED APPLICATION

This application is a continuation application of International Application No. PCT/CN2019/085265, filed on Apr. 30, 2019, the entire content of which is incorporated herein by reference.

TECHNICAL FIELD

The present disclosure relates to the field of control technology, and more specifically, to an electronic stabilization method, an image acquisition device, a movable platform, and a machine readable storage medium.

BACKGROUND

At present, most image acquisition devices, such as motion cameras, implement Electronic Image Stabilization (EIS) algorithms, which may be used to correct the attitude of a video (or an image) acquired by the image acquisition devices. For example, after a frame of image is exposed, the EIS algorithm may use a low-pass filter to process the spatial attitude data collected by a gyroscope for a period of time before the exposure time to generate a smooth curve (e.g., the target attitude). Subsequently, the EIS algorithm may calculate the amount of the attitude compensation based on the target attitude curve, and correct the video based on the attitude compensation amount. As such, the user may view a relatively smooth video image.

In the process of generating a smooth curve by using the EIS algorithm, it may be necessary to use a frequency domain low-pass filter. However, the frequency domain low-pass filter may produce a delay in seconds during the filtering process. If the user rotates the image acquisition device during the delay period, the real-time attitude and the target attitude of the image acquisition device may be greatly deviated, which may result in jittering or twitching of the video image, thereby impairing the viewing experience.

SUMMARY

The embodiments of the present disclosure provide an electronic stabilization method, an image acquisition device, a movable platform, and a machine readable storage medium.

One aspect of the present disclosure provides an image stabilization method. The method includes acquiring a frame of an image to be stabilized and a related exposure time; acquiring first attitude data before the exposure time and second attitude data after the exposure time, wherein the number of the first attitude data is one or more, and the number of the second attitude data is one or more; acquiring a target attitude corresponding to the exposure time based on the first attitude data and the second attitude data; and obtaining a stabilized target image by stabilizing the image to be stabilized according to the target attitude.

Another aspect of the present disclosure provides an image acquisition device. The image acquisition device includes: a processor, an image sensor, and a spatial attitude sensor; and the processor is connected to the image sensor and the spatial attitude sensor. The processor is configured to acquire a frame of an image to be stabilized and its exposure time; acquire first attitude data before the exposure time and second attitude data after the exposure time, wherein the number of the first attitude data is one or more, and the number of the second attitude data is one or more; acquire a target attitude corresponding to the exposure time based on the first attitude data and the second attitude data; and obtain a stabilized target image by stabilizing the image to be stabilized according to the target attitude.

It can be seen from the technical solution described above, in one embodiment, by acquiring the first attitude data before the exposure time and the second attitude after the exposure time, the target attitude corresponding to the exposure time at which the image acquisition device may be located may be acquired based on the first attitude data and the second attitude data. Subsequently, the image to be stabilized may be stabilized based on the target attitude to obtain the stabilized target image. As such, in the present embodiment, the second attitude data may be used to determine the motion of the image acquisition device after the image to be stabilized is exposed, thereby ensuring that a smooth target attitude may be obtained after filtering the actual motion of the image acquisition device and avoiding jittering or twitching in the stabilized image, which may improve the stability of the display and the viewing experience.

BRIEF DESCRIPTION OF THE DRAWINGS

In order to illustrate the technical solutions provided in the embodiments of the present disclosure more clearly, the accompanying drawings to be used for describing the embodiments are introduced briefly in the following description. It should be apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

The technical solutions in the embodiments of the present disclosure will be described below with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure. In the situation where the technical solutions described in the embodiments are not conflicting, they can be combined.

At present, most image acquisition devices, such as motion cameras, may include an Electronic Image Stabilization (EIS) algorithm, which may be used to correct the attitude of a video (or an image) acquired by the image acquisition devices. For example, after a frame of image is exposed, the EIS algorithm may use a low-pass filter to process the spatial attitude data collected by a gyroscope for a period of time before the exposure time to generate a smooth curve (e.g., the target attitude). Subsequently, the EIS algorithm may calculate the amount of the attitude compensation based on the target attitude curve, and correct the video based on the attitude compensation amount. As such, the user may view a relatively smooth video image.

In the conventional technology, in the process of generating a smooth curve by using the EIS algorithm, it may be necessary to use a frequency domain low-pass filter. However, the frequency domain low-pass filter may produce a delay in seconds during the filtering process. If the user rotates the image acquisition device during the delay period, the real-time attitude and the target attitude of the image acquisition device may be greatly deviated, which may result in jitters or twitches of the video image, thereby reducing the viewing experience.

An embodiment of the present disclosure provides an electronic stabilization method. The electronic stabilization method may use the attitude data before and after the exposure time of the image to be stabilized to perform a low-pass filtering on the actual attitude. As such, a smoother target attitude may be obtained. Subsequently, the image to be stabilized may be stabilized based on the target attitude, thereby ensuring the stability of the video image, avoiding the situation of jittering or twitching, and improving the viewing experience.

Figure 1:
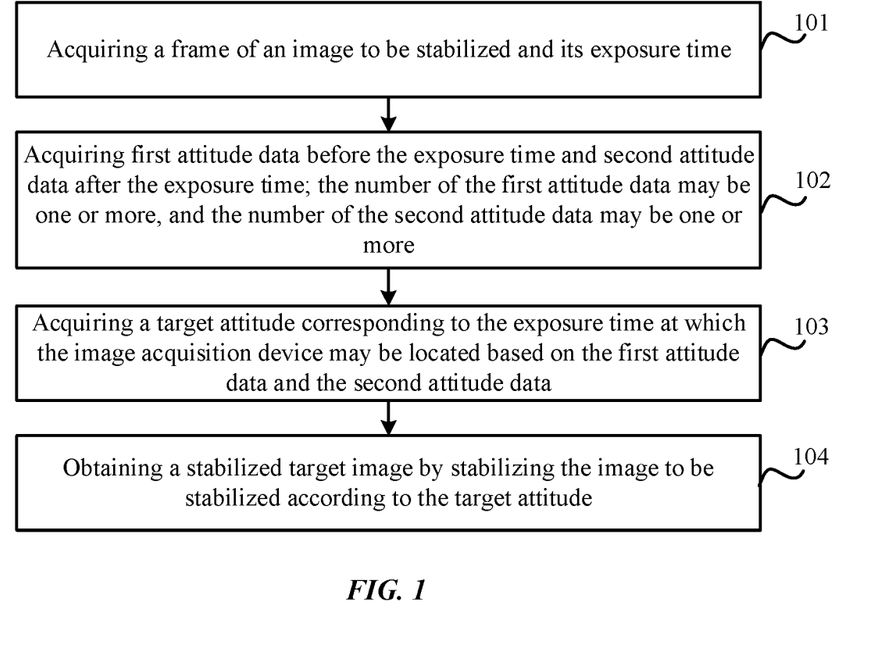
FIG. 1 is a flowchart of an electronic stabilization method according to an embodiment of the present disclosure.

FIG. 1 is a flowchart of an electronic stabilization method according to an embodiment of the present disclosure. The electronic stabilization method may be applied to an image acquisition device, such as a (motion) camera, a video camera, a handheld PTZ platform, etc. The electronic stabilization method is described in more detail below.

Step 101, acquiring a frame of an image to be stabilized and its exposure time.

In one embodiment, an image sensor in the image acquisition device may acquire a plurality of original images, which may be the images to be stabilized. The image sensor may be a CCD, a camera, etc. The image sensor may also acquire a time stamp of the image to be stabilized during the process of acquiring each frame of image to be stabilized. For example, the time stamp may be an exposure time of the frame of image to be stabilized, or the time stamp may be generated by using a predetermined algorithm based on the exposure time, which is not limited in the present disclosure. The time stamp in the following embodiments are described by taking the exposure time as an example.

In one embodiment, a processor in the image acquisition device may communicate with the image sensor. As such, the processor may acquire the image to be stabilized and its exposure time form the image sensor. In one embodiment, a First-In First-Out (FIFO) memory may be arranged in the image acquisition device, and the processor may store the acquired image to be stabilized in the FIFO memory. In other words, after the image sensor acquired the image to be stabilized, the acquired the image to be stabilized may be stored in the FIFO memory, then the processor may directly read the image to be stabilized from the FIFO memory.

In one embodiment, before the processor acquires the frame of the image to be stabilized, a predetermined number of frames of the image to be stabilized acquired by the image sensor may be acquired first, thereby ensuring a sufficient delay to facilitate the filtering of the frequency domain low-pass filter.

The predetermined number of frames of the image to be stabilized may be determined in advance. For example, to acquire the an image to be stabilized within 1 second, if the acquisition frequency of the image sensor is 30 fps, then the predetermined of frames of the image to be stabilized may be 30; and if the acquisition frequency of the image sensor is 60 fps, then the predetermined of frames of the image to be stabilized may be 60.

In addition, the predetermined number of frames of the image to be stabilized may also be associated based on the frequency domain low-pass filter that may be pre-arranged in the image acquisition device. For example, if the frequency domain low-pass filter takes a shorter amount of time to filter the actual attitude of the image acquisition device, the predetermine number of frames of the image to be stabilized may be appropriately increased; and if the frequency domain low-pass filter takes longer amount of time to filter the actual attitude of the image acquisition device, the predetermine number of frames of the image to be stabilized may be appropriately reduced.

That is, in the present embodiment, the predetermined number of frames of the image to be stabilized may be adjusted based on the specific use case. As long as the buffering of the image to be stabilized may be realized, the corresponding solutions may fall within the protection scope of the present disclosure.

In one embodiment, the frequency domain low-pass filter may include one or more of the following: a FIR filter, and an BR filter. It should be noted that a person skilled in the art may select a suitable frequency domain low-pass filter based on the specific use case. As long as the frequency domain low-pass filtering may be realized, the corresponding solutions may fall within the protection scope of the present disclosure.

Step 102, acquiring first attitude data before the exposure time and second attitude data after the exposure time; the number of the first attitude data may be one or more, and the number of the second attitude data may be one or more.

In one embodiment, a spatial attitude sensor in the image acquisition device may periodically acquire the attitude data of the image acquisition device at different times. The spatial attitude sensor may include a 3-axis gyroscope, a 3-axis accelerometer, a 3-axis electronic floppy disk, a GPS, etc., and a person skilled in the art may select the spatial attitude sensor based on the specific use case, which is not limited herein.

The period in which the spatial attitude sensor may acquire the attitude data may be associated with the period in which the image sensor may acquire the image to be stabilized. For example, 300 attitude data and 30 frames of the image to be stabilized may be acquired in 1 second. Of course, the period in which the spatial attitude sensor may acquire the attitude data may not be associated with the period in which the image sensor may acquire the image to be stabilized. A person skilled in the art may adjust the association between the period in which the spatial attitude sensor may acquire the attitude data and the period in which the image sensor may acquire the image to be stabilized, which is not limited herein.

In one embodiment, when acquiring the attitude data, the spatial attitude sensor may also generate a time stamp of the attitude data, such as the acquisition time, a stamp generated by using the predetermined algorithm based on the acquisition time, etc., which is not limited in the present disclosure.

It may be understood that attitude data corresponding to the time stamp of each frame of the image to be stabilized may be included in the attitude data. The correspondence with the time stamp may include the same time stamp or the difference of the time stamps being less than a predetermined threshold. The threshold may be determined based on the specific use case, such as 0.01 second, which is not limited herein.

In one embodiment, the processor may acquire the exposure time in step 101, and acquire the first attitude data before the exposure time and the second attitude data after the exposure time based on the exposure time. Further, the number of the first attitude data may be one or more, and the number of the second attitude data may be one or more. Compared with the use of the attitude data before the exposure time (it may be understood as the first attitude data of the present disclosure) in the conventional technology, in the embodiments of the present disclosure, the second attitude data may be added on the basis of the first attitude data to increase the time span of the attitude data, thereby ensuring that the low frequency motion of the image acquisition device after the exposure time may not affect the target attitude.

In one embodiment, the attitude data may further include third attitude data corresponding to the exposure time. In this case, the processor may combine the third attitude data with the first attitude data and the second attitude data. In the first attitude data, the third attitude data may be the last attitude data, and in the second attitude data, the third attitude data may be the first attitude data. Of course, when the number of the first attitude data and the second attitude data are large, the attitude data may not be used. A person skilled in the art may make the adjustment based on the specific use case, which is not limited herein.

In some embodiments, the first attitude data may correspond to a first time period, and the second attitude data may correspond to a second time period. The first time period corresponding to the first attitude may refer to the time difference between the time stamps of the first attitude data and the last attitude data in the first attitude data. It should be noted that if the first attitude data or the second attitude data only include 1 attitude data, which may correspond to a moment in time, in this case, the moment in time may be replaced by a smaller predetermined value, such as 0.01 second.

It should be noted that the image stored in the FIFO memory in step 101 may correspond to a third time period, and the third time period may be less than the sum of the first time period and the second time period. As such, the first frame or the last frame of the image to be enhanced may correspond to a sufficient amount of attitude to ensure the subsequent stabilization effect.

In one embodiment, the range of the values of the first time period and the second time period may include 0.5 second to 1 second. Considering the type of low-pass filter and its operating efficiency, the first time period corresponding to the first attitude data and the second time period corresponding to the second attitude data may be the same, for example, both may be 0.5 second. In this case, a symmetric frequency domain low-pass filter may be used to increase the filtering speed.

In another embodiment, the first time period corresponding to the first attitude data and the second time period corresponding to the second attitude data may be different, and a symmetric frequency domain low-pass filter may be used, thereby improving the filtering accuracy.

In one embodiment, considering that each frame of the image to be stabilized may correspond to a set of attitude data (e.g., the first attitude data and the second attitude data), a storage path of the attitude data may be used as feature data of the frame of the image to be stabilized while buffering each frame of the image to be stabilized. As such, the processor may read the attitude data from the corresponding storage path when reading each frame of the image to be stabilized, thereby improving the reading efficiency.

In another embodiment, for two adjacent frames of the image to be stabilized, the second attitude data of the previous frame of the image to be stabilized and the first attitude data of the subsequent frame of the image to be stabilized may not overlap, thereby reducing the amount of data calculation. Or, the previous frame of the image to be stabilized and the first attitude data of the subsequent frame of the image to be stabilized may overlap, thereby ensuring a smoother target attitude may be subsequently obtained.

Step 103, acquiring target attitude corresponding to the exposure time at which the image acquisition device may be located based on the first attitude data and the second attitude data.

Figure 2:
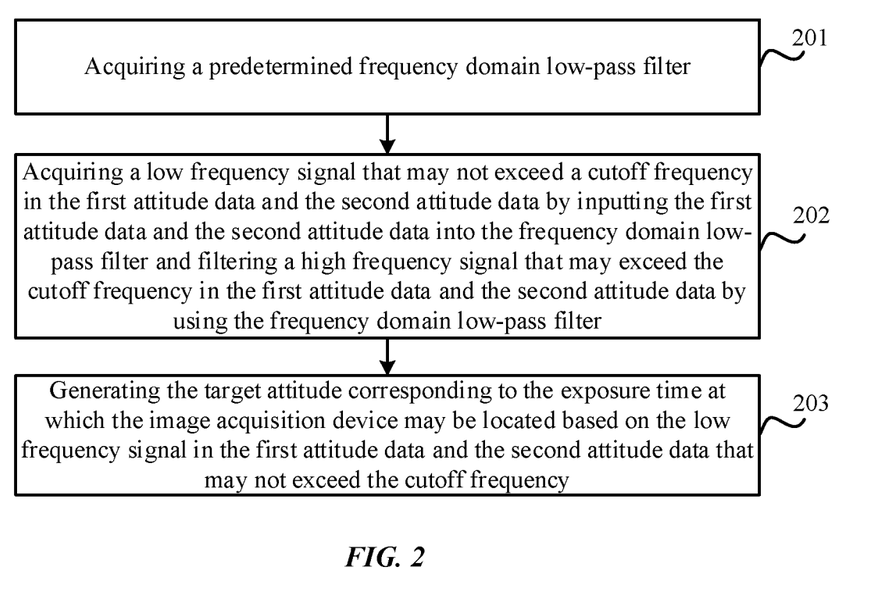
FIG. 2 is a flowchart for acquiring a target attitude according to an embodiment of the present disclosure.

In one embodiment, referring to FIG. 2, the processor may acquire a predetermined frequency domain low-pass filter (correspondingly, step 201). The frequency domain low-pass filter may include one or more of the following: a FIR filter, and an IIR filter.

Subsequently, the processor may acquire a low frequency signal that may not exceed a cutoff frequency in the first attitude data and the second attitude data by inputting the first attitude data and the second attitude data into the frequency domain low-pass filter and filtering a high frequency signal that may exceed the cutoff frequency in the first attitude data and the second attitude data by using the frequency domain low-pass filter (correspondingly, step 202). It should be understood that if the frequency domain low-pass filter includes the function of frequency domain transformation, then the first attitude data and the second attitude data may be directly input to the frequency domain low-pass filter. Alternatively, if the frequency domain low-pass filter does not include the function of frequency domain transformation, then a frequency domain transformation may be performed on the first attitude data and the second attitude data, and the first and second attitude data after the frequency domain transformation may be input to the frequency domain low-pass filter. For the method for performing the frequency domain transformation, reference may be made to the related technology, which is not limited herein.

The range of the cutoff frequency of the frequency domain low-pass filter may be between 0.5 Hz and 10 Hz. In one embodiment, the cutoff frequency of the frequency domain low-pass filter may be 0.5 Hz. It may be understood that the lower the cutoff frequency of the frequency domain low-pass filter, the stronger the ability to filter the high frequency signal in the attitude data, and the smoother the target attitude may be. That is, the slower the motion of the image acquisition device, the lower the impact on the subsequent displayed video image may be.

Subsequently, the processor may generate the target attitude corresponding to the exposure time at which the image acquisition device may be located based on the low frequency signal in the first attitude data and the second attitude data that may not exceed the cutoff frequency (correspondingly, step 203).

Figure 3A:
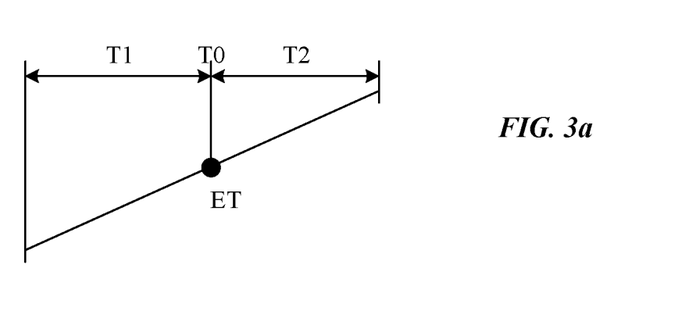
FIGS. 3a-3c are schematic diagrams of a real-time attitude and a target attitude according to an embodiment of the present disclosure.

Taking the monotonic motion of the image acquisition device as an example, where the monotonic motion may refer to the movement of the image acquisition device in one direction, including a uniform speed, an acceleration, and a deceleration. Taking the uniform motion as an example, referring to FIGS. 3a-3c, the actual attitude of the image acquisition device is illustrated in FIG. 3a, which may include an actual exposure point ET, an exposure time T0, and the attitude data including a first attitude data in a first time period T1 before the exposure time T0, and a second attitude data in a second time period T2 after the exposure time T0.

Figure 3B:
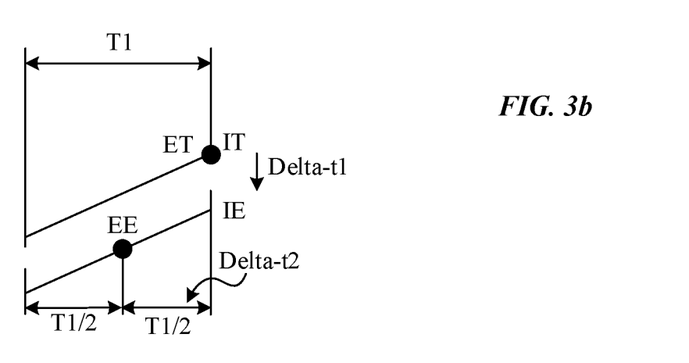

Referring to FIG. 3b, the processor may acquire the first attitude data, where the time for tasks such as acquiring, storing, and pre-processing may be Delta-t1, the first attitude data may correspond to an actual attitude IT, and a target attitude IE may be obtained based on the first attitude data. In the case where the frequency domain low-pass filter may be used as the median filter, a median point EE of the first attitude data may be located at T½. Since the image to be stabilized at the actual exposure point ET may be stabilized by using the data at the median point EE, there may be a delay Delta-t2 between the median point EE and the actual exposure point ET, where the delay Delta-t2 may equal to T½. The delay may be due to the processing result obtained by the low-pass filter, that is, a deviation between the median point EE and the actual exposure point ET, or it may be understood as a filtering error. Further, if the image acquisition device jitters during the delay Delta-t2, a deviation may occur if the data at the median point EE is used to stabilize the image to be stabilized.

Figure 3C:
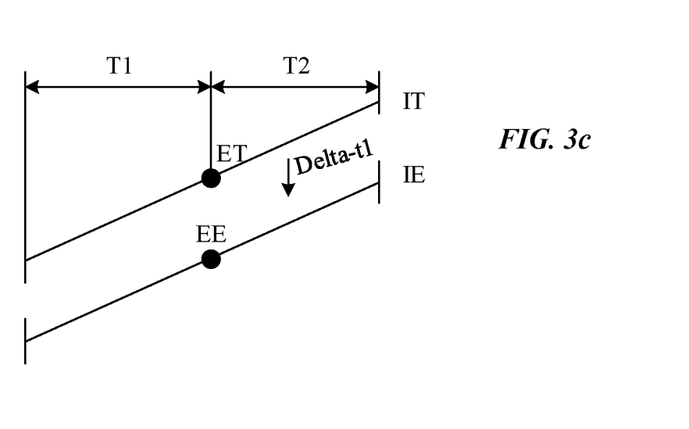

Referring to FIG. 3c, the processor may acquire the first attitude data and the second attitude data, where the time for tasks such as acquiring, storing, and pre-processing the first attitude data and the second attitude data may be Delta-t1, and the first attitude data and the second attitude data may correspond to an actual attitude IT. Taking T1 equals T2 as an example, the processor may obtain the target attitude IE based on the first attitude data and the second attitude data. In the case where the frequency domain low-pass filter may be used as the median filter, the median point EE of the first attitude data and the second attitude data may be located at T0, that is, it may overlap with the actual exposure point ET. As such, the delay Delta-t2 of T½ shown in FIG. 3b may be avoided, that it, the delay Delta-t2 may equal to 0. In this case, when the data at the median point EE is used to stabilize the image to be stabilized at the actual exposure time ET, the image acquisition device may not vibrate, such that the result of using the data at the median point EE to stabilize the image to be stabilized may be more accuracy.

Figure 4:
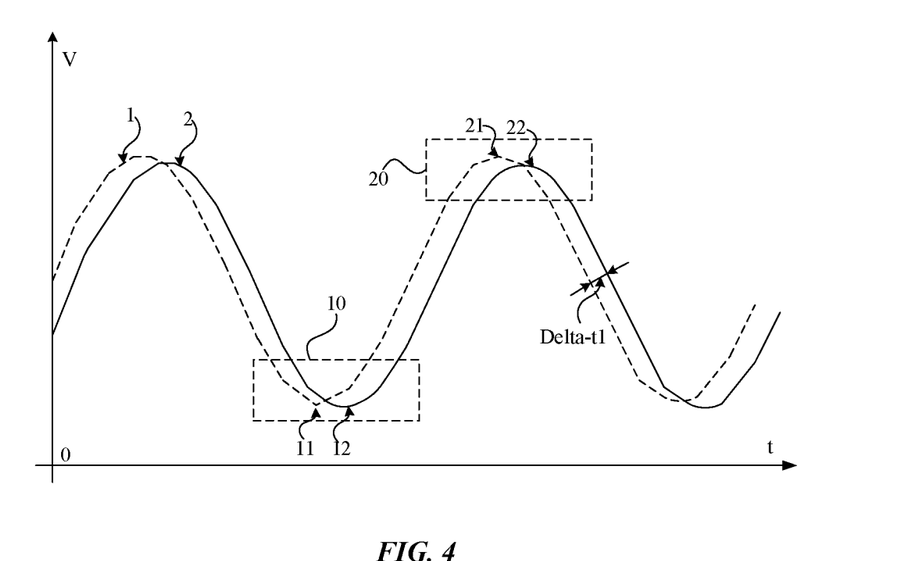
FIG. 4 is a schematic diagram of a target attitude according to an embodiment of the present disclosure.

It should be noted that when the first time period equal to the second time period, the median point EE and the actual exposure point ET may overlap or be similar, that is, the actual attitude and the target attitude may overlap. Considering that the processor may need the delay Delta-t1 to acquire and store the attitude data, the fluctuation between the actual attitude and the target attitude may be as shown in FIG. 4. FIG. 4 is a schematic diagram of a target attitude according to an embodiment of the present disclosure. Referring to FIG. 4, a curve indicated by reference numeral 1 may be the actual attitude of the image acquisition device, and a curve indicated by the reference numeral 2 may be the target attitude of the image acquisition device. Taking a rectangular area 10 and a rectangular area 20 in FIG. 4 as an example. A jittering portion 11 may be included in the actual attitude 1 in the rectangular area 10. After the frequency domain low-pass filtering, an area 12 corresponding jittering portion 11 on the target attitude may be smoothed. The results corresponding to the reference numerals 21 and 22 in the rectangular area 20 may be similar and will not be described again.

In one embodiment, when the first time period and the second time period are different, as the gap between the time period and the second time period increase, the delay between the median point E and the actual exposure point may also increase. It may be understood that with the addition of the second attitude data in the second time period, the delay between median point EE and the actual exposure point ET may still be less than the delay between the median point EE and the actual exposure point ET shown in FIG. 3b. That is, the IE in FIG. 3c may be smoother than the IE in FIG. 3b.

It may be understood that in order to increase to efficiency of the electronic stabilization method, in one embodiment, the delay between the median point EE and the actual exposure point ET may not exceed a predetermined delay threshold. That is, the delay between the zero frequency of the target attitude and the zero frequency of the actual attitude of the image acquisition device may not exceed the predetermined delay threshold. In one embodiment, a range of the delay threshold may be between 0 to 0.5 second. In another embodiment, the delay threshold may be 0.1 second or 0.5 second.

Step 104, obtaining a stabilized target image by stabilizing the image to be stabilized by using the target attitude.

Figure 5:
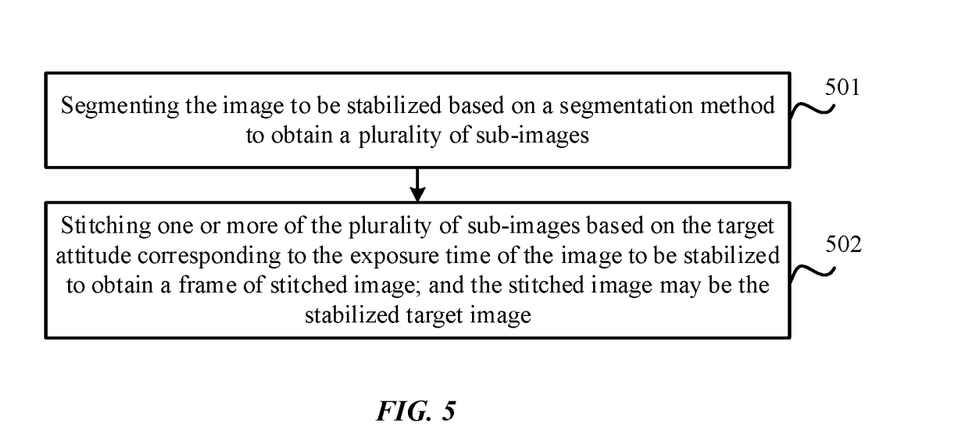
FIG. 5 is a flowchart of an electronic stabilization method according to another embodiment of the present disclosure.

In one embodiment, referring to FIG. 5, the processor may segment the image to be stabilized based on a segmentation method to obtain a plurality of sub-images (correspondingly, step 501). The segmentation method may include one or more of the following: a grid segmentation, and a uniform segmentation. Subsequently, the processor may stitch one or more of the plurality of sub-images based on the target attitude corresponding to the exposure time of the image to be stabilized to obtain a frame of stitched image; and the stitched image may be the stabilized target image (correspondingly, step 502).

It may be understood that the size of the target image may be smaller than the size of the image to be stabilized. In other words, the target image may be a portion of the image may be a portion of the image that may be cropped from the image to be stabilized.

It should be noted that during the stitching process, the target attitude may be close to the edge of the image to be stabilized, in this case, the target attitude may need to be properly translated, thereby ensuring that the target image may not include an edge region of the image to be stabilized or a blank region outside the image.

In one embodiment, the processor may directly stabilize the image to be stabilized based on the target attitude corresponding to the exposure time of each of the images to be stabilized, and the stabilization method may be referred to the stabilization method shown in FIG. 5.

In one embodiment, the processor may acquire a previous frame of the target image. Further, the processor may directly stabilize each of the images to be stabilized in response to the target image not exceeding a boundary of the image to be stabilized; and the processor may stabilize each of the images to be stabilized in a case where the processor may maintain a boundary of the target image not exceeding the boundary of image to be stabilized in response to the boundary of the target image coinciding with the boundary of the image to be stabilized.

It may be understood that in the present embodiment, only two examples of the image stabilization method were introduced. A person skilled in the art may select an appropriate image stabilization method based on the specific use case, and the corresponding solution may fall within the protection scope of the present disclosure.

Figure 6:
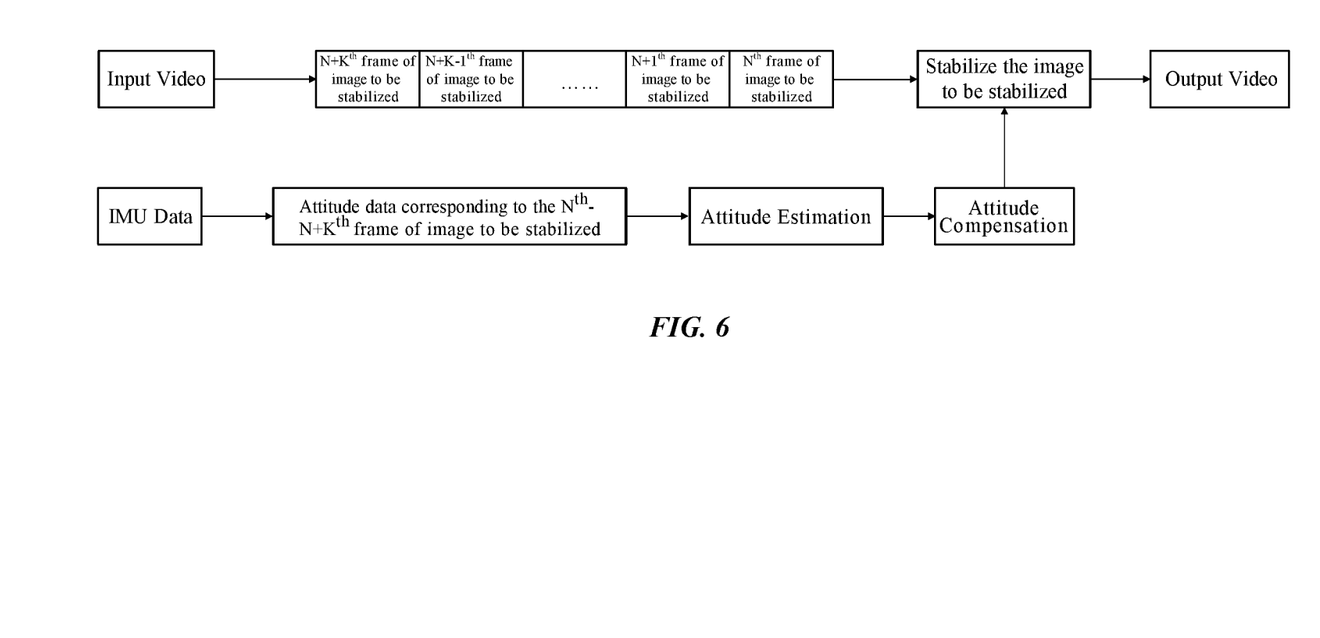
FIG. 6 is a flowchart of an electronic stabilization method according to still another embodiment of the present disclosure.

Referring to FIG. 6, after the processor sequentially stabilizes each frame of the image to be stabilized, an input video may be realized. As such, after the video is outputted and displayed, a relatively stable image may be displayed.

It can be seen that by acquiring the first attitude data before the exposure time and the second attitude after the exposure time, the target attitude corresponding to the exposure time at which the image acquisition device may be located may be acquired based on the first attitude data and the second attitude data. Subsequently, the image to be stabilized may be stabilized based on the target attitude to obtain the stabilized target image. As such, in the present embodiment, the second attitude data may be used to determine the motion of the image acquisition device after the image to be stabilized is exposed, thereby ensuring that a smooth target attitude may be obtained after filtering the actual motion of the image acquisition device and avoiding jitter or twitching in the stabilized image, which may improve the stability of the display and the viewing experience.

In one embodiment, the present disclosure further provides an image acquisition device. The image acquisition device may include a processor, an image sensor, and a spatial attitude sensor. The processor may be communicatively connected with the image sensor and the spatial attitude sensor. The process may be configured to acquire a frame of an image to be stabilized and its exposure time; acquire first attitude data before the exposure time and second attitude data after the exposure time, where the number of the first attitude data may be one or more, and the number of the second attitude data may be one or more; acquire a target attitude corresponding to the exposure time at which the image acquisition device may be located based on the first attitude data and the second attitude data; and obtain a stabilized target image by stabilizing the image to be stabilized by using the target attitude.

In one embodiment, before acquiring a frame of the image to be stabilized, the processor may be further configured to acquire a predetermined number of frames of the image to be stabilized acquired by the image sensor in the image acquisition device, wherein the image to be stabilized may include a time stamp.

In one embodiment, the image to be stabilized may be stored in a FIFO memory which may be used to store a predetermined number of frames of image.

In one embodiment, before acquiring a frame of the image to be stabilized, the processor may be further configured to acquire the attitude data acquired by the spatial attitude sensor in the image acquisition device. The attitude data may include the first attitude data, the second attitude data, and the third attitude data of the exposure time; a time stamp; and attitude data that may correspond to the time stamp of each image to be stabilized.

In one embodiment, the first time period corresponding to the first attitude data and the second time period corresponding to the second attitude data may be the same; or, the first time period corresponding to the first attitude data and the second time period corresponding to the second attitude data may be different.

In one embodiment, the range of the values of the first time period and the second time period may include 0.5 second to 1 second.

In one embodiment, for two adjacent frames of image to be stabilized, the second attitude data of the previous frame of the image to be stabilized and the first attitude data of the subsequent frame of the image to be stabilized may overlap.

In one embodiment, the image to be stabilized of the image stored in the FIFO memory may correspond to the third time period, and the third time period may be less than the sum of the first time period and the second time period.

In one embodiment, the processor may be configured to acquire a target attitude corresponding to the exposure time at which the image acquisition device may be located based on the first attitude data and the second attitude data, which may include acquiring a predetermined frequency domain low-pass filter; acquire a low frequency signal that may not exceed a cutoff frequency in the first attitude data and the second attitude data by inputting the first attitude data and the second attitude data into the frequency domain low-pass filter and filtering a high frequency signal that may exceed the cutoff frequency in the first attitude data and the second attitude data by using the frequency domain low-pass filter; and generate the target attitude corresponding to the exposure time at which the image acquisition device may be located based on the low frequency signal in the first attitude data and the second attitude data that may not exceed the cutoff frequency.

In one embodiment, the delay between the zero frequency of the target attitude and the zero frequency of the actual attitude of the image acquisition device may not exceed the predetermined delay threshold.

In one embodiment, a range of the delay threshold may be between 0 to 0.5 second.

In one embodiment, the range of the cutoff frequency of the frequency domain low-pass filter may be between 0.5 Hz and 10 Hz.

In one embodiment, the frequency domain low-pass filter may include one or more of the following: a FIR filter, and an BR filter.

In one embodiment, the processor may be configure to obtain a stabilized target image based on the image to be stabilized by using the target attitude, which may include segmenting the image to be stabilized based on a segmentation method to obtain a plurality of sub-images; and stitching one or more of the plurality of sub-images based on the target attitude corresponding to the exposure time of the image to be stabilized to obtain a frame of stitched image, where the stitched image may be the stabilized target image.

In one embodiment, the present disclosure further provides a movable platform. The movable platform may include a body, a power supply battery, a power system, a flight controller, and an image acquisition device as described in the above embodiments. The power supply battery may be used to power the power system, and the power system may provide the flight power to an unmanned aerial vehicle.

In one embodiment, the present disclosure further provides a machine-readable storage medium. The machine-readable storage medium may store a plurality of computer executable instructions that, when executed, may implement the processes of the method shown in FIGS. 1-5.

It should be noted that the relationship terms used in the text of this application, such as first and second, are only for distinguishing an object or operation from another object or operation, but not for defining or implying any practical relation or order between the object or operation. The terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . ." shall not obviate that in addition to containing the said essential element in the process, method, object or equipment, other essential element of the same nature may also exist in the above-mentioned process, method, object or equipment.

The electronic stabilization method, image acquisition device, movable platform, and the machine-readable storage medium provided in embodiments of the present disclosure have been described in detail above, in the present disclosure the particular examples are used to explain the principle and embodiments of the present disclosure, and the above description of embodiments is merely intended to facilitate understanding the methods in the embodiments of the disclosure and concept thereof; meanwhile, it is apparent to persons skilled in the art that changes can be made to the particular implementation and application scope of the present disclosure based on the concept of the embodiments of the disclosure, in view of the above, the contents of the specification shall not be considered as a limitation to the present disclosure.

What is claimed is:

1. An electronic stabilization method, comprising:
   acquiring a frame of an image to be stabilized and a related exposure time;
   acquiring first attitude data before the exposure time and second attitude data after the exposure time, wherein the number of the first attitude data is one or more, and the number of the second attitude data is one or more;
   acquiring a frequency domain low-pass filter;
   acquiring a low frequency signal that does not exceed a cutoff frequency in the first attitude data and the second attitude data by filtering a high frequency signal that exceeds the cutoff frequency in the first attitude data and the second attitude data using the frequency domain low-pass filter;
   generating a target attitude corresponding to the exposure time based on the low frequency signal in the first attitude data and the second attitude data that does not exceed the cutoff frequency; and
   obtaining a stabilized target image by stabilizing the image to be stabilized according to the target attitude.

2. The method of claim 1, wherein before acquiring the frame of the image to be stabilized, the method further includes:
   acquiring a number of the frames of the image to be stabilized acquired by an image sensor of the image acquisition device, the image to be stabilized including a time stamp.

3. The method of claim 2, wherein the image to be stabilized is stored in a first-in first-out memory.

4. The method of claim 2, wherein before acquiring the frame of the image to be stabilized, the method further includes:
   acquiring attitude data obtained by a spatial attitude sensor of the image acquisition device, the attitude data including:
   the first attitude data and the second attitude data, or a third attitude data of the exposure time;
   the time stamp; and
   one attitude data that corresponds to the time stamp of each image to be stabilized.

5. The method of claim 1, wherein a first time period corresponding to the first attitude data and a second time period corresponding to the second attitude data are different.

6. The method of claim 5, wherein a value range of the first time period and the second time period includes 0.5 second to 1 second.

7. The method of claim 5, wherein for two adjacent frames of image to be stabilized, the second attitude data of a previous frame of the image to be stabilized overlaps with the first attitude data of a subsequent frame of the image to be stabilized.

8. The method of claim 5, wherein the image to be stabilized corresponds to a third time period, the third time period being less than a sum of the first time period and the second time period.

9. The method of claim 1, wherein a delay between the exposure time of the target attitude and an exposure time of an actual attitude of the image acquisition device does not exceed a delay threshold.

10. The method of claim 9, wherein a value range of the delay threshold includes 0-0.5 seconds.

11. The method of claim 1, wherein a value range of the cutoff frequency of the frequency domain low-pass filter is between 0.5 Hz to 10 Hz.

12. The method of claim 1, wherein the frequency domain low-pass filter includes one or more of a FIR filter and an IIR filter.

13. The method of claim 1, further including:
    segmenting the image to be stabilized based on a segmentation method to obtain a plurality of sub-images; and
    stitching one or more of the plurality of sub-images based on the target attitude corresponding to the exposure time of the image to be stabilized to obtain a frame of stitched image, wherein the stitched image is the stabilized target image.

14. An image acquisition device comprising:
    a processor, an image sensor, and a spatial attitude sensor;
    wherein the processor is connected to the image sensor and the spatial attitude sensor; and
    wherein the processor is configured to:
    acquire a frame of an image to be stabilized and an exposure time of the image to be stabilized;
    acquire first attitude data before the exposure time and second attitude data after the exposure time, wherein the number of the first attitude data is one or more, and the number of the second attitude data is one or more;
    acquire a frequency domain low-pass filter;
    acquire a low frequency signal that does not exceed a cutoff frequency in the first attitude data and the second attitude data by filtering a high frequency signal that exceeds the cutoff frequency in the first attitude data and the second attitude data using the frequency domain low-pass filter;
    generate a target attitude corresponding to the exposure time at which the image acquisition device is located based on the low frequency signal in the first attitude data and the second attitude data that does not exceed the cutoff frequency; and
    obtain a stabilized target image by stabilizing the image to be stabilized according to the target attitude.

15. The image acquisition device of claim 14, wherein the processor is further configured to:
  acquire a number of the frames of the image to be stabilized acquired by the image sensor in the image acquisition device, the image to be stabilized including a time stamp.

16. The image acquisition device of claim 14, wherein a first time period corresponding to the first attitude data and a second time period corresponding to the second attitude data are the same.

17. The image acquisition device of claim 14 wherein a delay between the exposure time of the target attitude and an exposure time of an actual attitude of the image acquisition device does not exceed a delay threshold.

18. The image acquisition device of claim 14, wherein the processor is further configured to:
  segment the image to be stabilized based on a segmentation method to obtain a plurality of sub-images; and
  stitch one or more of the plurality of sub-images based on the target attitude corresponding to the exposure time of the image to be stabilized to obtain a frame of stitched image, the stitched image being the stabilized target image.

* * * * *